(12) United States Patent
Chuang et al.

(10) Patent No.: US 9,471,742 B2
(45) Date of Patent: Oct. 18, 2016

(54) METHOD FOR DISPLAYING TIMING INFORMATION OF AN INTEGRATED CIRCUIT FLOORPLAN IN REAL TIME

(71) Applicant: Taiwan Semiconductor Manufacturing Company, Ltd., Hsin-Chu (TW)

(72) Inventors: Yi-Lin Chuang, Taipei (TW); Huang-Yu Chen, Zhudong Township (TW); Yun-Han Lee, Baoshan Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 5 days.

(21) Appl. No.: 14/523,176

(22) Filed: Oct. 24, 2014

(65) Prior Publication Data

US 2015/0046890 A1 Feb. 12, 2015

Related U.S. Application Data

(63) Continuation of application No. 13/942,177, filed on Jul. 15, 2013, now Pat. No. 8,898,608.

(51) Int. Cl.
*G06F 17/50* (2006.01)

(52) U.S. Cl.
CPC ....... *G06F 17/5081* (2013.01); *G06F 17/5031* (2013.01); *G06F 17/5072* (2013.01); *G06F 17/5068* (2013.01); *G06F 2217/06* (2013.01); *G06F 2217/84* (2013.01)

(58) Field of Classification Search
CPC .................. G06F 17/5068; G06F 2217/84
USPC .................. 716/139, 108, 118, 122
See application file for complete search history.

(56) References Cited

U.S. PATENT DOCUMENTS

| | | | | |
|---|---|---|---|---|
| 5,870,309 A * | 2/1999 | Lawman | ............. | G06F 17/5054 716/102 |
| 5,910,899 A * | 6/1999 | Barrientos | .......... | G06F 17/5072 716/113 |
| 6,516,456 B1 * | 2/2003 | Garnett | ............... | G06F 17/5022 716/119 |
| 6,584,606 B1 * | 6/2003 | Chiu | .................... | G06F 17/5036 716/112 |
| 6,910,200 B1 * | 6/2005 | Aubel | ................... | G06F 17/505 703/13 |
| 7,086,014 B1 * | 8/2006 | Bartz | ................. | G06F 17/5045 345/594 |
| 7,117,473 B1 * | 10/2006 | Knol | ................... | G06F 17/5072 716/124 |
| 7,146,595 B2 * | 12/2006 | Knol | ................... | G06F 17/5072 716/119 |
| 7,831,942 B1 * | 11/2010 | Gennari | .............. | G06F 17/5068 430/30 |
| 8,181,145 B2 * | 5/2012 | Rice | .................... | G06F 17/5068 716/132 |
| 8,397,194 B2 * | 3/2013 | Uppaluri | ............. | G06F 17/5022 716/107 |
| 8,423,939 B1 * | 4/2013 | Hurst | .................... | G06F 17/505 703/19 |
| 8,423,949 B2 * | 4/2013 | Furumoto | ............... | G06F 17/50 716/100 |
| 8,504,978 B1 | 8/2013 | Bhardwaj et al. | | |
| 8,539,402 B1 | 9/2013 | Bhardwaj et al. | | |
| 8,555,217 B1 * | 10/2013 | Khong | ................ | G06F 17/5054 345/501 |
| 8,635,582 B2 * | 1/2014 | Stellari | ............... | G06F 17/5022 345/619 |

(Continued)

*Primary Examiner* — Stacy Whitmore (74) *Attorney, Agent, or Firm* — Slater Matsil, LLP (57) ABSTRACT

A method includes (a) generating timing information of an integrated circuit (IC) floorplan by a processing unit, (b) displaying on a display device a representation of the IC floorplan according to the timing information, (c) receiving user input via an input device, the user input associated with an IC macro of the IC floorplan, (d) updating the timing information associated with the IC macro to generated updated timing information according to the user input, and (e) altering display of the representation according to the updated timing information.

20 Claims, 9 Drawing Sheets

(56) References Cited

U.S. PATENT DOCUMENTS

| | | | |
|---|---|---|---|
| 8,640,081 B2* | 1/2014 | Hastings | G06F 17/5036 716/116 |
| 8,661,377 B2* | 2/2014 | Bendicksen | G06F 17/5081 716/102 |
| 8,689,169 B2* | 4/2014 | Fischer | G06F 17/5081 716/100 |
| 8,745,560 B1* | 6/2014 | Bhardwaj | G06F 17/5036 716/111 |
| 8,782,577 B2* | 7/2014 | Fischer | G06F 17/5068 716/100 |
| 8,806,414 B2* | 8/2014 | Huang | G06F 17/5081 716/106 |
| 8,935,642 B1* | 1/2015 | Bhardwaj | G06F 17/505 716/105 |
| 8,977,994 B1* | 3/2015 | Levitsky | G06F 17/5031 716/104 |
| 2001/0010090 A1* | 7/2001 | Boyle | G06F 17/505 716/105 |
| 2004/0128638 A1* | 7/2004 | Kerzman | G06F 17/5072 716/119 |
| 2005/0108668 A1 | 5/2005 | Kabuo | |
| 2005/0172252 A1* | 8/2005 | Cheng | G06F 17/5072 716/124 |
| 2005/0268269 A1* | 12/2005 | Coiley | G06F 17/5045 716/113 |
| 2006/0080630 A1* | 4/2006 | Lin | G06F 17/5077 716/115 |
| 2007/0226668 A1* | 9/2007 | Dasdan | G06F 17/5031 716/108 |
| 2008/0005713 A1 | 1/2008 | Singh et al. | |
| 2009/0064068 A1* | 3/2009 | Ng | G06F 17/5068 716/113 |
| 2009/0271742 A1* | 10/2009 | Zhang | G06F 9/4443 715/854 |
| 2012/0311512 A1* | 12/2012 | Michel | G06F 17/5031 716/104 |
| 2013/0268903 A1* | 10/2013 | Michel | G06F 17/5031 716/104 |
| 2013/0275938 A1* | 10/2013 | Bendicksen | G06F 17/5081 716/139 |
| 2014/0189624 A1* | 7/2014 | Segal | G06F 17/505 716/108 |
| 2014/0282315 A1* | 9/2014 | Wakefield | G06F 17/504 716/106 |
| 2015/0026655 A1* | 1/2015 | Segal | G06F 17/505 716/112 |

* cited by examiner

FIG. 11

METHOD FOR DISPLAYING TIMING INFORMATION OF AN INTEGRATED CIRCUIT FLOORPLAN IN REAL TIME

This application is a continuation of U.S. patent application Ser. No. 13/942,177, filed Jul. 15, 2013, and entitled "Method for Displaying Timing Information of an Integrated Circuit Floor plan," which application is incorporated here by reference.

BACKGROUND

The semiconductor industry has experienced rapid growth due to improvements in the integration density of a variety of electronic components (e.g., transistors, diodes, resistors, capacitors, etc.). For the most part, this improvement in integration density has come from shrinking the semiconductor process node (e.g., shrinking the process node towards the sub-20 nm node).

Electronic design automation (EDA) software tools provide a variety of functions related to design, simulation, analysis, verification, and manufacturing of integrated circuits (ICs). Advances in computing speed and power, as well as memory capacity, have reduced the amount of time required to complete such functions. Simultaneously, increased design complexity (number of devices and interconnections there between) and more rapid design cycles cause IC designers to rely more heavily on EDA software tools to produce IC layouts that perform correctly while meeting time-to-market goals.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely methods of displaying timing information of an integrated circuit (IC) floorplan in an EDA environment as an aid to a designer. Other embodiments may also be applied, however, to other types of EDA tool functions.

Throughout the various figures and discussion, like reference numbers refer to like objects or components. Also, although singular components may be depicted throughout some of the figures, this is for simplicity of illustration and ease of discussion. A person having ordinary skill in the art will readily appreciate that such discussion and depiction can be and usually is applicable for many components within a structure.

In the following disclosure, novel methods are introduced. The methods use visual cues to provide designers with real-time information about timings of circuit blocks as the designer modifies the IC floorplan in the EDA environment.

Figure 1:
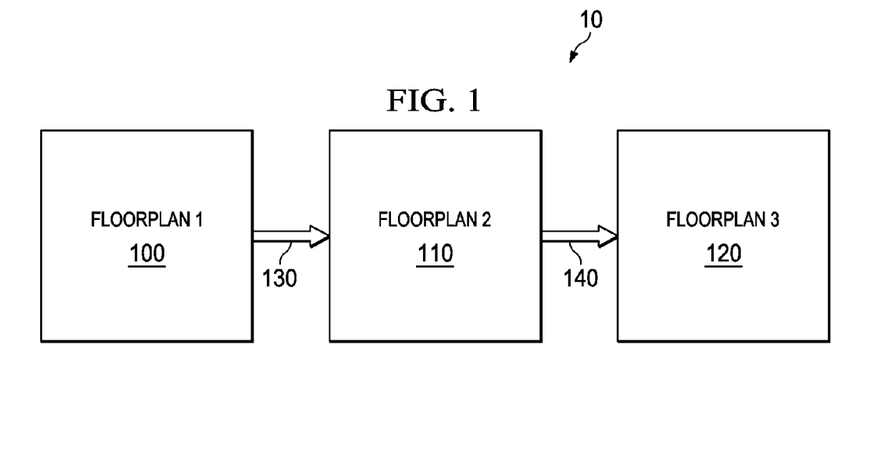
FIG. 1 is a diagram showing a design flow in accordance with various embodiments of the present disclosure.

FIG. 1 is a diagram showing a design flow 10 in accordance with various embodiments of the present disclosure. A first floorplan 100 of an integrated circuit (IC), such as an application-specific integrated circuit (ASIC) or the like, is provided. In some embodiments, the first floorplan 100 is loaded into EDA software. In some embodiments, the first floorplan 100 is provided by a design house to a semiconductor foundry. In some embodiments, the first floorplan 100 is provided by an ASIC design services company.

A designer modifies 130 the first floorplan 100 to generate a second floorplan 110. In some embodiments, the modifying 130 includes changing parameters of circuit macros in the first floorplan 100 to generate the second floorplan 110. In some embodiments, the parameters include location parameters, size parameters, performance parameters, and the like. In some embodiments, the second floorplan 110 includes substantially the same list of component objects (e.g., registers, macros, logic gates, and the like) as the first floorplan 100, and differs from the first floorplan 100 in at least one of the parameters assigned to at least one of the component objects. For example, the designer may modify location parameters (e.g., X and Y coordinates) of a memory macro of the IC. In some embodiments, the modifying 130 includes adding or removing circuit blocks or interconnects of the first floorplan 100 to generate the second floorplan 110.

A design assistance user interface (UI) 140 of the EDA software is used by the designer to modify the second floorplan 110 to generate a third floorplan 120 from the second floorplan 110. The design assistance UI 140 provides visual aids to the designer related to performance aspects of the IC floorplan. In some embodiments, the visual aids are updated in real-time as the designer modifies the IC floorplan. For example, the visual aids are updated as the designer drags a graphical representation of a component as displayed through the design assistance UI 140.

Figure 2:
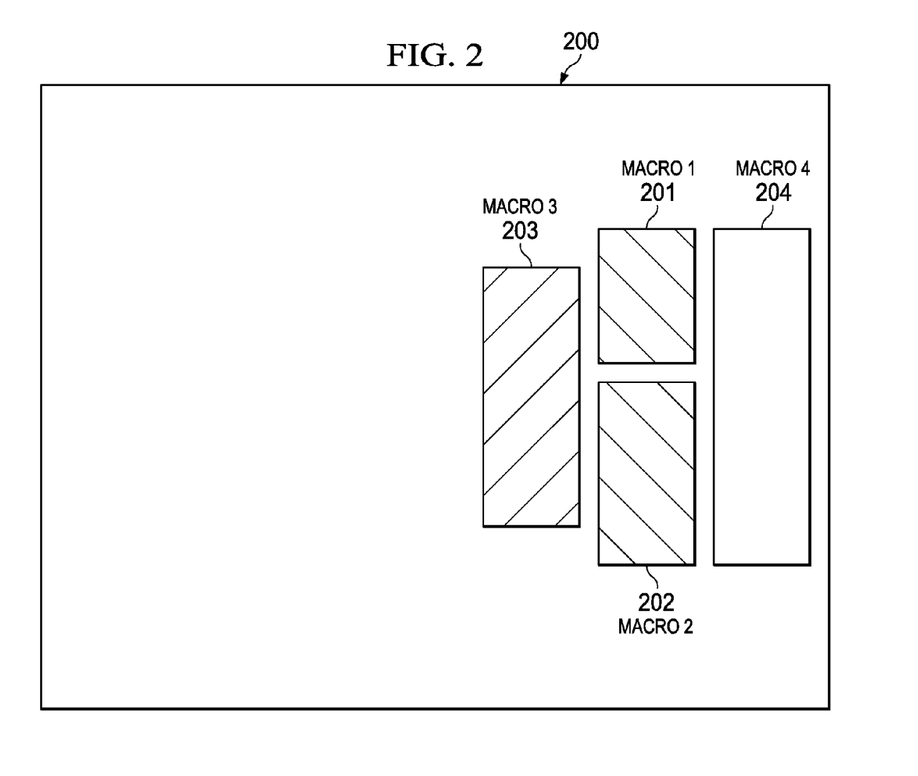
FIG. 2 is a diagram showing a first view of the design assistance UI in accordance with various embodiments of the present disclosure.

FIG. 2 is a diagram showing a first view 200 of the design assistance UI 140 in accordance with various embodiments of the present disclosure. The first view 200 is a graphical representation of an IC floorplan in the design assistance UI 140 of the EDA software. In some embodiments, the first view 200 is displayed in a first window or frame of the EDA software. For illustrative purposes, first, second, third and fourth IC macro graphics 201-204 are displayed as part of the IC floorplan as shown in FIG. 2. The first, second, third, and fourth IC macro graphics 201-204 are associated with IC macro objects in the EDA software. In some embodiments, the IC macro objects describe locations, layouts, electrical properties, and the like of IC macros of an integrated circuit.

In the design assistance UI 140, highlighting is applied to each of the first to fourth IC macro graphics 201-204 (as shown by hatching patterns in FIG. 2) to indicate timing information associated with the first to fourth IC macro graphics 201-204. In some embodiments, the timing information includes timing violation information, skew information, fan-in information, or the like. For example, a "worst negative slack" (WNS) metric may be used to indicate negative slack corresponding to a register-to-macro (R2M) path of many R2M paths having the largest timing violation. In another example, a "total negative slack" (TNS) metric may be used to indicate total timing violations of all R2M paths to the IC macro.

In some embodiments, the first IC macro graphic 201 is displayed having a first color associated with a first slack range. In some embodiments, the second IC macro graphic 202 is displayed having the first color. In some embodiments, the third IC macro graphic 203 is displayed having a second color associated with a second slack range different from the first slack range. In some embodiments, the fourth IC macro graphic 204 is displayed having a default color associated with a third slack range. In some embodiments, the third slack range is from zero to a positive value. In some embodiments, the third skew range is from a first positive slack value to a second (higher) positive slack value.

In some embodiments, the first slack range and the second slack range are non-overlapping. In some embodiments, the first color is different from the second color. In some embodiments, a gradient color scale defines a first association between the first color and the first slack range, and a second association between the second color and the second slack range. In some embodiments, the first color is associated with a first slack, the second color is associated with a second slack, and the third color is associated with a third slack. In some embodiments, a gradient color scale defines a color for each slack. In some embodiments, the first color is calculated by an algorithm from the first slack, the second color is calculated by the algorithm from the second slack, and the third color is calculated by the algorithm from the third slack.

In some embodiments, other types of highlighting are applied to the first to fourth IC macro graphics 201-204 as an aid to the designer. In some embodiments, different hatchings are displayed on the first to fourth IC macro graphics 201-204 to indicate different levels or ranges of WNS or TNS. In some embodiments, lines of the first to fourth IC macro graphics 201 are narrowed or bolded to indicate different levels or ranges of WNS or TNS. In some embodiments, the highlighting is in the form of textual cues related to the timing information (e.g., explicit display of the slack (or violation) levels associated with the first to fourth IC macro graphics 201-204).

Figure 3:
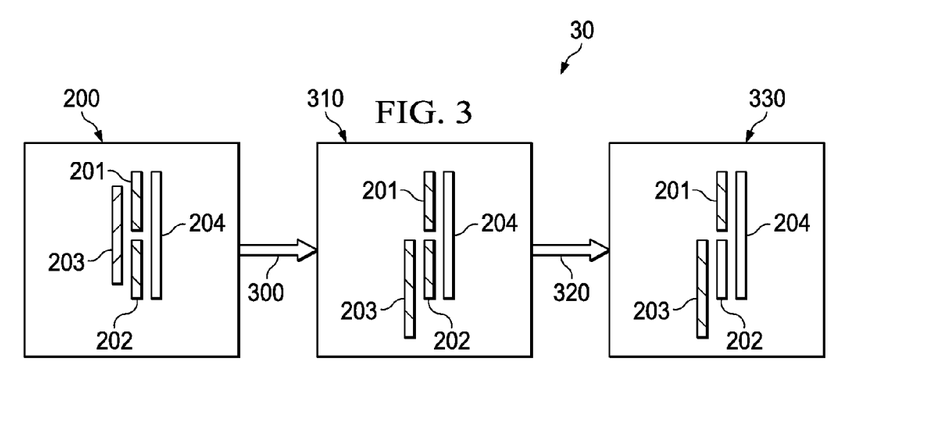
FIG. 3 is a diagram showing a design flow in accordance with various embodiments of the present disclosure.

FIG. 3 is a diagram showing a design flow 30 in accordance with various embodiments of the present disclosure. The first view 200 showing the first to fourth IC macro graphics 201-204 with the highlighting associated with the timing information is displayed. Through action 300 of the designer, the third IC macro graphic 203 is relocated to a new position to generate a second view 310. In some embodiments, the action 300 includes selecting the third IC macro graphic 203 by an input device, dragging the third IC macro graphic 203, and dropping the third IC macro graphic 203. In some embodiments, the selecting is accomplished by clicking on the third IC macro graphic 203. In some embodiments, the selecting is accomplished by touching a region of the display associated with the third IC macro graphic 203 by an input device (e.g., a finger, a stylus, or the like).

In some embodiments, highlighting of the third IC macro graphic 203 is updated in real time as the third IC macro graphic 203 is dragged in the design assistance UI 140. The EDA software recalculates the timing information associated with the third IC macro graphic 203 as location of the third IC macro graphic 203 relative to other circuit elements (e.g., registers) of the IC floorplan changes. For example, the third IC macro represented by the third IC macro graphic 203 may have fan-in of thirty registers (other numbers of registers connected to the third IC macro are also contemplated herein). Negative slack associated with the thirty registers is variable based on the location of the third IC macro (represented by the location of the third IC macro graphic 203 in the second view 310). Positive slack (e.g., in memory-to-register, or "M2R", paths) is variable based on the location of the third IC macro. Changing the location of the third IC macro betters, worsens, or keeps the same the negative and positive slack associated with the third IC macro. The location of the third IC macro is directly related to distance between each of the thirty registers and the third IC macro. The timing information (e.g., negative slack) associated with the third IC macro is affected by how near or far the third IC macro is from each of the thirty registers. The highlighting of the third IC macro graphic 203 changes as the location of the third IC macro is changed to reflect the recalculated timing information associated with the location of the third IC macro.

After the designer has completed manual relocation of the first to fourth IC macro graphics 201-204, a third view 330 is displayed in the design assistance UI 140. The third view 330 is generated according to a useful skew function 320 performed on the IC floorplan represented by the second view 310. In some embodiments, the useful skew function 320 injects clock tree delay in R2M paths connected to an IC macro (e.g., the third IC macro) having positive slack in M2R paths connected to the IC macro. As a result, timing violations associated with the first to fourth IC macros are removed, and WNS or TNS is reduced. The highlighting of the first to fourth IC macro graphics 201-204 is changed for each of the first to fourth IC macros for which the timing information changes following the useful skew function 320 being performed. For example, highlighting of the first and third IC macro graphics 201, 203 is changed from the first color to a third color associated with a fourth skew range. Highlighting of the second IC macro graphic 202 is changed from the second color to the default color. Highlighting of the fourth IC macro graphic 204 is unchanged.

Figure 4:
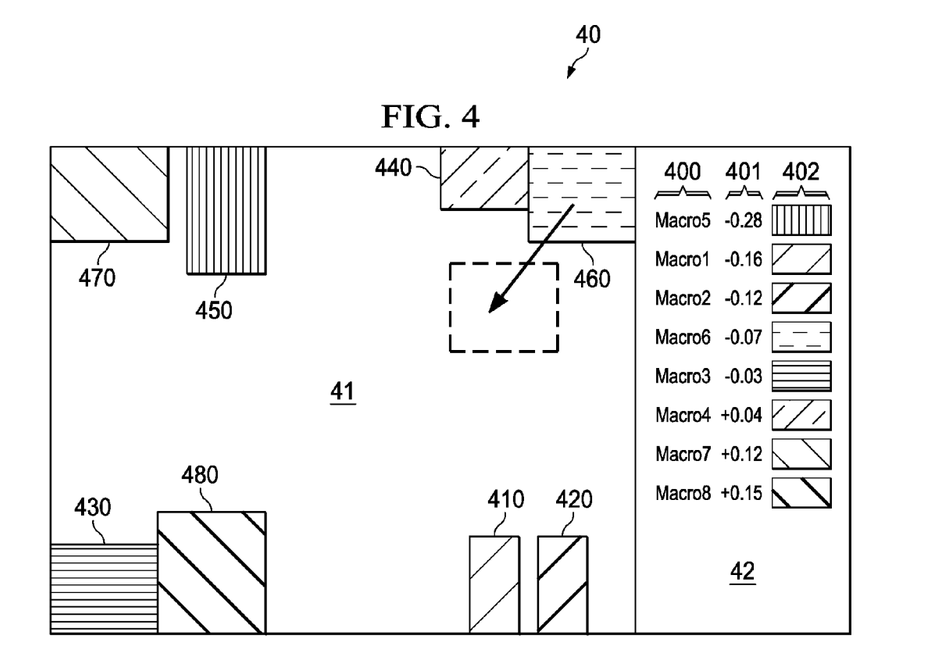
FIG. 4 is a diagram showing a fourth view of the design assistance UI in accordance with various embodiments of the present disclosure.

FIG. 4 is a diagram showing a fourth view 40 of the design assistance UI in accordance with various embodiments of the present disclosure. In some embodiments, the fourth view 40 is displayed in a display device connected to a computer (e.g., a workstation, a server, a personal computer, a laptop, or the like). A first display region 41 shows a floorplan view of an IC. First to eighth graphics 410-480 associated with first to eighth IC macros are displayed within the first display region 41. A second display region 42 is adjacent the first display region 41. Macro names 400 associated with the first to eighth graphics 410-480 are displayed in column list fashion. Timing information 401 associated with the first to eighth IC macros are displayed adjacent the macro names 400 in column list fashion. Highlighting images 402 associated with the timing information 401 and the macro names 400 are displayed adjacent the timing information 401 in column list fashion. In some embodiments, the timing information 401 displayed in the second display region 42 is numeric, and represents WNS in nanoseconds. In some embodiments, the highlighting images 402 include a two-dimensional shape showing a miniature version of the highlighting (e.g., color, hatching, or the like).

Shown by an arrow and rectangle (in dashed lines), the sixth graphic 460 is draggable in a direction indicated by the arrow to a location indicated by the rectangle. In some embodiments, each of the eight graphics 410-480 is draggable to available space (e.g., not occupied by another of the eight graphics 410-480) of sufficient size on the floorplan. In some embodiments, as the sixth graphic 460 is dragged, the timing information 401 and the highlighting image 402 associated with the sixth graphic 460 are updated (e.g., modified) in real time on the display device. In some embodiments, highlighting (e.g., color) of the sixth graphic 460 in the first display region 41 is also updated in real time on the display device as the sixth graphic 460 is dragged. The designer sees how repositioning of each IC macro in the floorplan shown in the first display region 41 affects timing of the IC macro through the visual cues provided by the fourth view 40.

Figure 5:
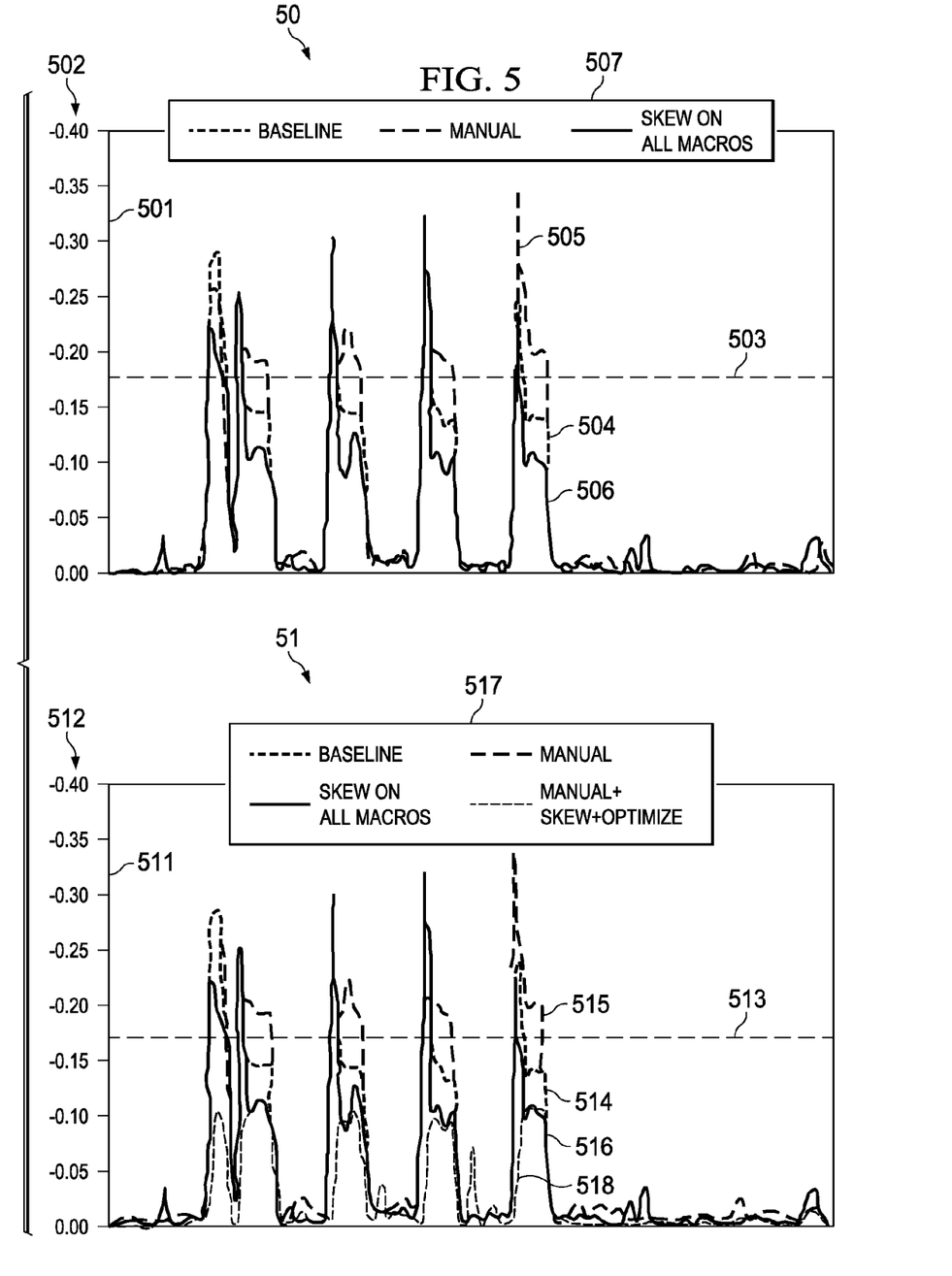
FIG. 5 is a diagram showing graph views of the design assistance UI in accordance with various embodiments of the present disclosure.

FIG. 5 is a diagram showing graph views 50, 51 of the design assistance UI 140 in accordance with various embodiments of the present disclosure. One or both of the graph views 50, 51 is displayed in a view of the IC floorplan (e.g., the fourth view 40). For example, the graph view 51 may be displayed adjacent the first display region 41 and above or below the second display region 42. Vertical axes 501, 511 of the graph views 50, 51 are displayed to indicate a timing metric (e.g., WNS, TNS, or the like) of the IC floorplan. Numeric value labels 502, 512 are displayed adjacent ticks of the vertical axes 501, 511 to provide a numeric frame of reference for the designer. For example, the graph 50 shows numeric values of 0 to −0.4 as the numeric value labels 502 displayed next to the vertical axis 501. Reference lines 503, 513 are displayed associated with a level (e.g., −0.17) of the timing metric. In some embodiments, the level is associated with a speed target for the IC floorplan.

Data lines 504-506, 514-516 associated with various design stages of the IC floorplan are displayed as plotted in a graph space adjacent the vertical axes 501, 511 and opposite the numeric value labels 502, 512. In some embodiments, each of the data lines 504-506, 514-516 includes a value of the timing metric indexed (along the horizontal axis) by associated macro. Legends 507, 517 are displayed to provide visual aids for identifying each of the data lines 504-506, 514-516 and a fourth data line 518 as associated with the various design stages.

As shown in FIG. 5, the data lines 504, 514 are associated with a baseline design stage (e.g., the first view 200, prior to manipulation by the designer). The data lines 505, 515 are associated with a manual manipulation design stage (e.g., as described with regards to the second view 310 of FIG. 3, and the fourth view 40 of FIG. 4). The data lines 506, 516 are associated with a useful skew design stage (e.g., the third view 330 of FIG. 3). The fourth data line 518 is associated with an optimization design stage. In some embodiments, the optimization design stage is performed on the IC floorplan following the useful skew design stage and the manual manipulation design stage. In some embodiments, one or more of the data lines 504-506, 514-516, 518 is updated as one or more IC macro graphics (e.g., the graphics 410-480) are repositioned through the dragging by the input device. For example, as the sixth graphic 460 is dragged, the data lines 514, 515, 518 associated with the manual manipulation, useful skew, and optimization design stages are updated. In some embodiments, the data lines 515, 518 are updated with predictive timing information calculated on-the-fly associated with the useful skew and optimization operations. For example, the EDA software may estimate the WNS of the IC floorplan that will be given by the useful skew function prior to performing the useful skew function. In some embodiments, the updating of the data lines 515, 518 is performed in real-time as the IC macro graphic (e.g., the sixth graphic 460) is dragged by the input device.

Figure 6:
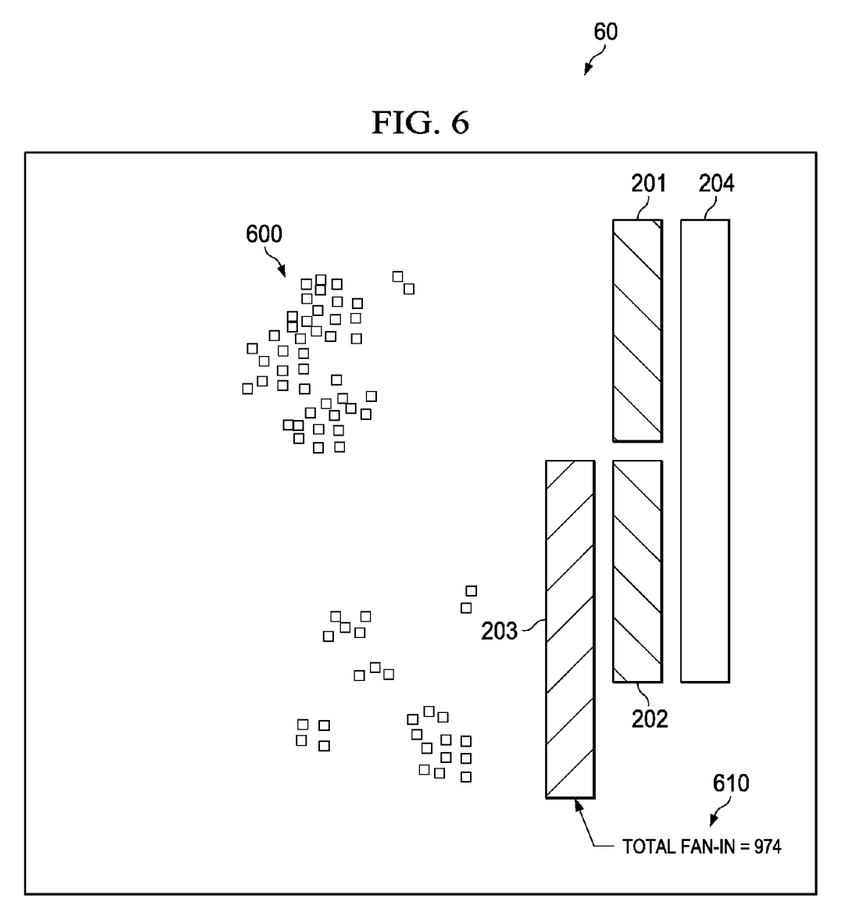
FIG. 6 is a diagram showing a sixth view of the design assistance UI in accordance with various embodiments of the present disclosure.

FIG. 6 is a diagram showing a sixth view 60 of the design assistance UI 140 in accordance with various embodiments of the present disclosure. The sixth view 60 is displayed to provide a visual aid to the designer related to fan-in of IC macros of an IC floorplan. In addition to the first to fourth IC macro graphics 311-314, register graphics 600 corresponding to registers of the IC floorplan are also displayed. In some embodiments, the register graphics 600 displayed are associated with registers connected to a selected IC macro graphic (e.g., the third IC macro graphic 203). In some embodiments, register graphics associated with registers not connected to the selected IC macro graphic are hidden (not displayed). In some embodiments, the register graphics 600 displayed are associated with all of the registers connected to the IC macro represented by the selected IC macro graphic. In some embodiments, the register graphics 600 displayed are associated with less than all of the registers connected to the IC macro represented by the selected IC macro graphic.

A fan-in indicator 610 is displayed to provide an immediate visual cue to the designer as to a number of registers that fan in to the selected IC macro graphic. For example, in FIG. 6, the fan-in indicator 610 includes an introductory text ("Total Fan-In="), a number ("974"), and an arrow pointing from the introductory text and the number to the selected IC macro graphic. The number displayed represents the number of registers connected to the IC macro associated with the selected IC macro graphic.

Figure 7:
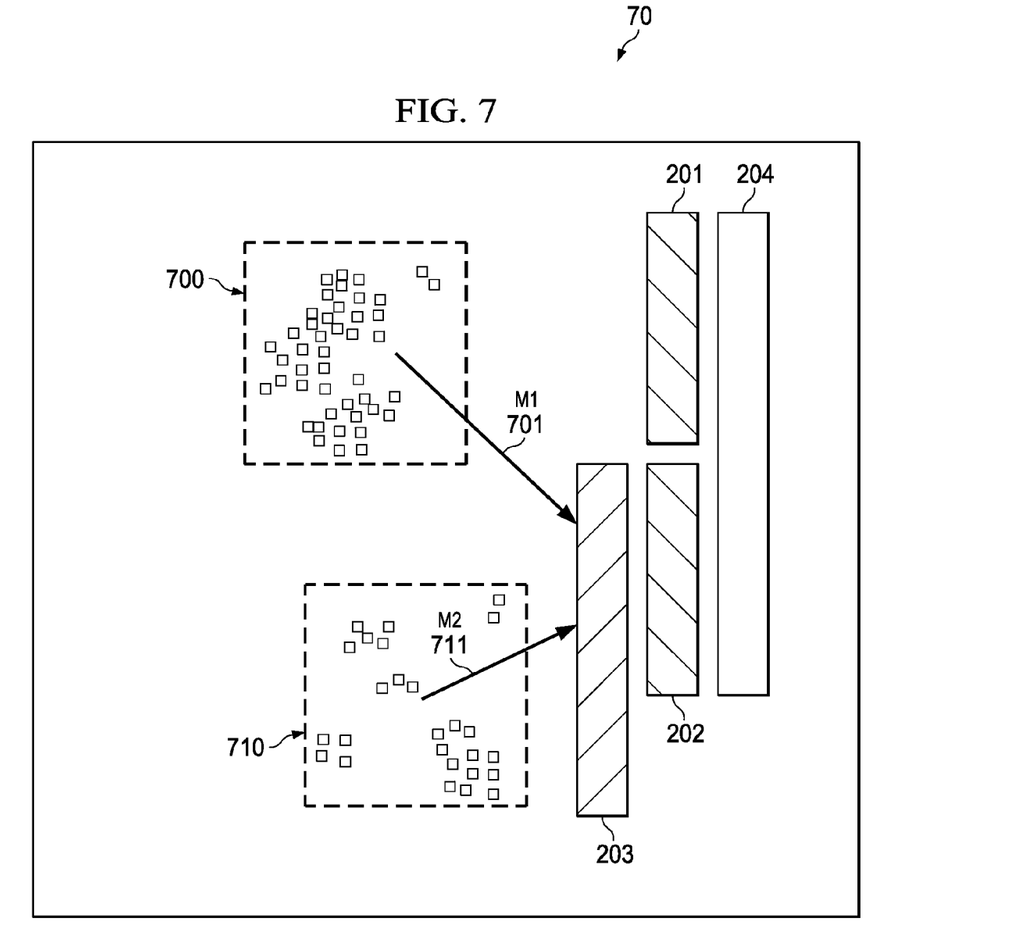
FIG. 7 is a diagram showing a seventh view of the design assistance UI in accordance with various embodiments of the present disclosure.

FIG. 7 is a diagram showing a seventh view 70 of the design assistance UI 140 in accordance with various embodiments of the present disclosure. A first group of register graphics 700 associated with a first group of registers fanning in to the third IC macro is displayed in the seventh view 70. A second group of register graphics 710 associated with a second group of registers fanning in to the third IC macro is also displayed in the seventh view 70. In some embodiments, more than two groups of register graphics associated with registers fanning in to the third IC macro are displayed in the seventh view 70. First highlighting is applied to the first group of register graphics 700 to indicate first timing information (e.g., WNS) associated with the first group of registers. In some embodiments, color, boldness, hatching, or the like, is used to highlight the first group of register graphics 700 to indicate the first timing information.

Second highlighting is applied to the second group of register graphics 710 to indicate second timing information (e.g., WNS) associated with the second group of registers. In some embodiments, the same category of highlighting (e.g., color, boldness, or hatching) is applied to the second group, but different highlighting types (e.g., red, blue, green) are applied to the first group and the second group.

A first timing indicator 701 is displayed in the seventh view 70 to provide a visual aid to the designer related to a timing metric (e.g., WNS, margin, or the like) associated with the first group of registers. In some embodiments, the first timing indicator 701 includes an arrow and text. In some embodiments, the arrow is displayed stretching from an inner point associated with the first group of register graphics 700 to a point near or on the third IC macro graphic 203. In some embodiments, the text displayed includes a sign (e.g., a "+" or "−" sign), a number (e.g., "225," "1050," or the like), and letters (e.g., "ps", "ns", or the like). In some embodiments, the letters correspond to a measure of time (e.g., "ps" for picoseconds).

A second timing indicator 711 is displayed in the seventh view 70 to provide a visual aid to the designer related to a timing metric (e.g., WNS, margin, or the like) associated with the second group of registers. In some embodiments, the second timing indicator 711 includes an arrow and text. In some embodiments, the arrow is displayed stretching from an inner point associated with the second group of register graphics 710 to a point near or on the third IC macro graphic 203. In some embodiments, the text displayed includes a sign (e.g., a "+" or "−" sign), a number (e.g., "225," "1050," or the like), and letters (e.g., "ps", "ns", or the like). In some embodiments, the letters correspond to a measure of time (e.g., "ps" for picoseconds).

In some embodiments, the texts and the arrows of the first and second timing indicators 701, 711, and the highlightings of the first and second groups of register graphics 700, 710 and the third IC macro graphic 203 are all updated in real time as the third IC macro graphic 203 is dragged. For example, coloring of the first group of register graphics 700 may change from a first color (e.g., a red color) to a second color (e.g., an orange color) as the third IC macro graphic 203 is dragged. Coloring of the second group of register graphics 710 may change from a third color (e.g., a green color) to a fourth color (e.g., a yellow color). The text of the first timing indicator 701 may change from a first string (e.g., "−250 ps") to a second string (e.g., "−200 ps"). The first string is associated with the timing metric of the third IC macro at a first position from which the third IC macro graphic 203 is dragged. The second string is associated with the timing metric of the third IC macro at a second position to which the third IC macro graphic 203 is dragged. The text of the second timing indicator 711 may change from a third string (e.g., "+150 ps") to a fourth string (e.g., "+110 ps"). The third string is associated with the timing metric of the third IC macro at a first position from which the third IC macro graphic 203 is dragged. The fourth string is associated with the timing metric of the third IC macro at a second position to which the third IC macro graphic 203 is dragged.

Figure 8:
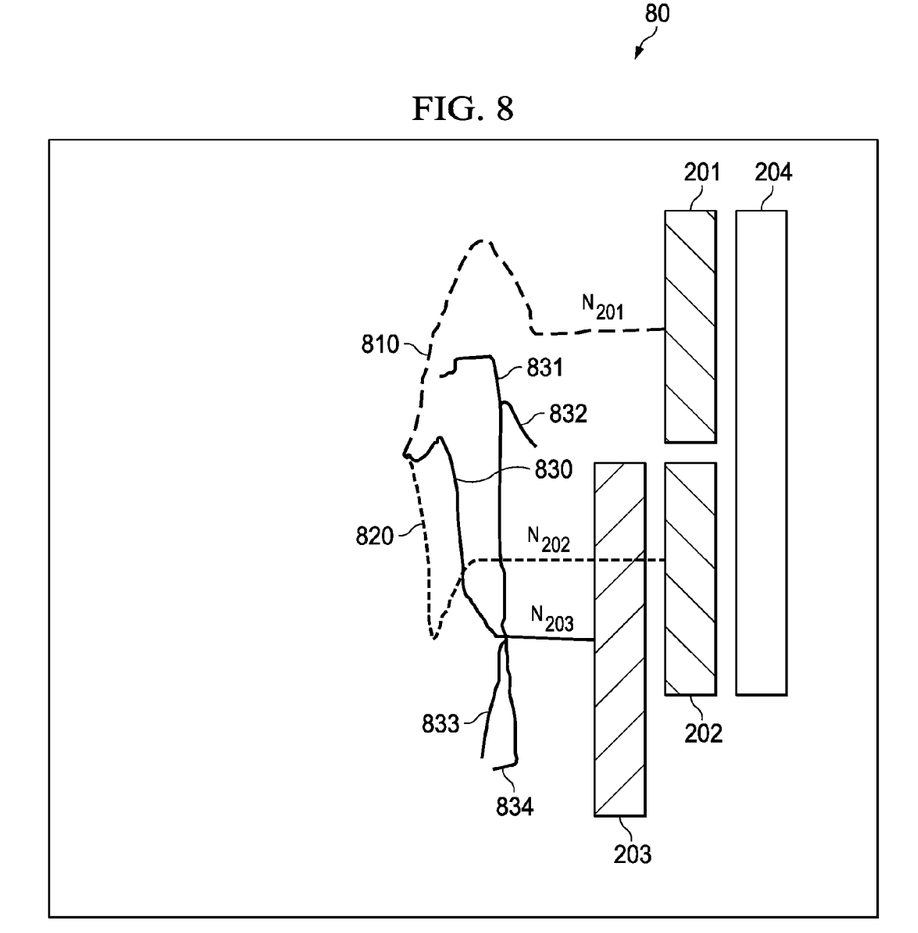
FIG. 8 is a diagram showing an eighth view of the design assistance UI in accordance with various embodiments of the present disclosure.

FIG. 8 is a diagram showing an eighth view 80 of the design assistance UI 140 in accordance with various embodiments of the present disclosure. In some embodiments, the IC floorplan includes at least two modules having pins scattered over the IC floorplan. Each of the at least two modules is connected to at least one IC macro of the floorplan. Paths connect the at least two modules to the at least one IC macro. In the eighth view 80, at least one of the paths having a timing violation is displayed and highlighted.

For example, first through fifth paths 830-834 to the third IC macro graphic 203 are highlighted with a first highlighting (e.g., color, boldness, solid/dashed/dotted lines or the like). A first violations indicator $N_{203}$ is displayed near the third IC macro graphic 203. Sixth and seventh paths 810, 820 to the first IC macro graphic 201 and the second IC macro graphic 202, respectively, are highlighted with second and third highlightings. A second violations indicator $N_{201}$ is displayed near the first IC macro graphic 201. A third violations indicator $N_{202}$ is displayed near the second IC macro graphic 202. The first, second, and third violations indicators $N_{203}$, $N_{201}$, $N_{202}$ display text. In some embodiments, the text is associated with number of violations, number of types of violations, or the like. For example, the first violations indicator $N_{203}$ may be a string "5 types" displayed near the third IC macro graphic 203. The second violations indicator $N_{201}$ may be a string "1 type" displayed near the first IC macro graphic 201. Each type of violation is associated with one of the at least two modules of the IC floorplan.

Figure 9:
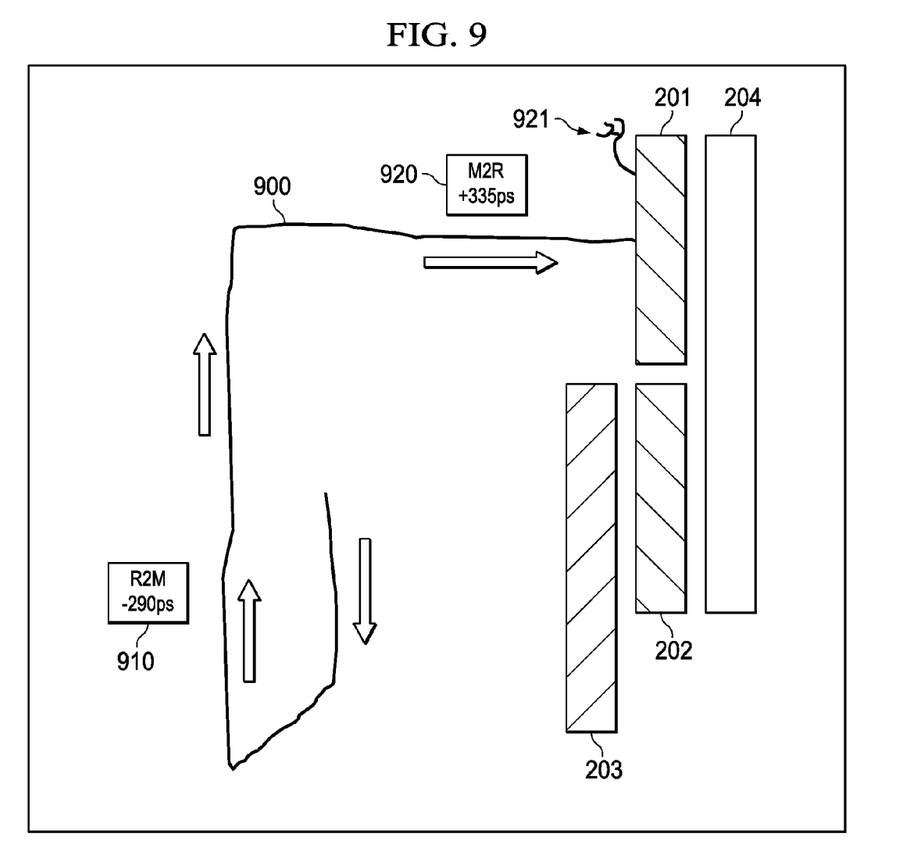
FIG. 9 is a diagram showing a ninth view of the design assistance UI in accordance with various embodiments of the present disclosure.

FIG. 9 is a diagram showing a ninth view 90 of the design assistance UI 140 in accordance with various embodiments of the present disclosure. An R2M path graphic 900 and at least one M2R path graphic 921 associated with an R2M path leading into the first IC macro and an M2R path leading out of the first IC macro are displayed in the ninth view 90. The R2M path is associated with a first register connected to the first IC macro. The M2R path is associated with a second register connected to the first IC macro. Negative slack associated with the R2M path is displayed in a first graphic 910 near the R2M path graphic 900. Positive slack associated with the M2R path is displayed in a second graphic 920 near the M2R path graphic 921. For example, a first text string "R2M −290 ps" of the first graphic 910 identifies the R2M path and associated negative slack (−290 picoseconds) of the R2M path. A second text string "M2R+335 ps" of the second graphic 920 identifies the M2R path and associated positive slack (+335 picoseconds) of the M2R path. The graphics 900, 910, 920, 921 provide a visual aid to the designer, informing the designer of potential benefits of applying the useful skew function on the IC floorplan. In some embodiments, more than one R2M path and more than one M2R path associated with more than one of the first to fourth IC macros are represented by graphics similar to the graphics 900, 910, 920, 921 at the same time in the ninth view 90.

Figure 10:
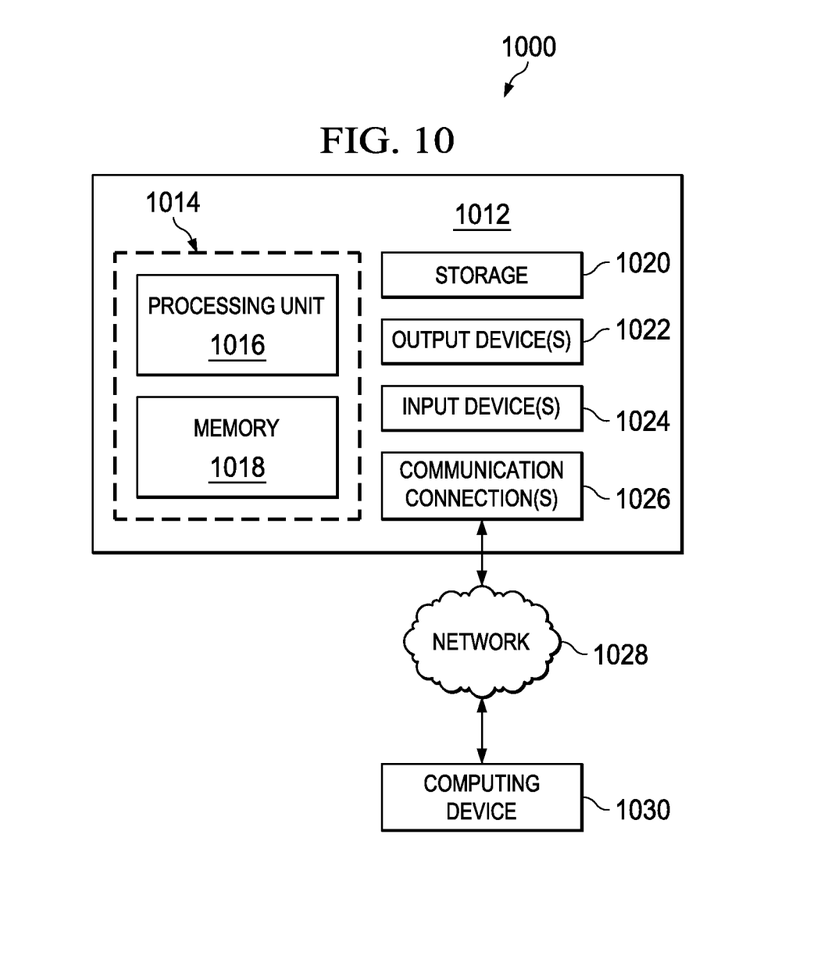
FIG. 10 illustrates an example of a system including a computing device configured to implement various embodiments provided herein.

FIG. 10 illustrates an example of a system 1000 including a computing device 1012 configured to implement various embodiments provided herein. In one configuration, computing device 1012 includes at least one processing unit 1016 and memory 1018. In some embodiments, depending on the exact configuration and type of computing device, memory 1018 is volatile, such as RAM, non-volatile, such as ROM, flash memory, etc., or some combination of the two. This configuration is illustrated in FIG. 10 by dashed line 1014.

In other embodiments, device 1012 includes additional features or functionality. For example, device 1012 also includes additional storage such as removable storage or non-removable storage, including, but not limited to, magnetic storage, optical storage, and the like. Such additional storage is illustrated in FIG. 10 by storage 1020. In some embodiments, computer readable instructions to implement one or more embodiments provided herein are in storage 1020. Storage 1020 also stores other computer readable instructions to implement an operating system, an application program, and the like. Computer readable instructions are loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device are also included in device 1012. Input device(s) 1024 and output device(s) 1022 are connected to device 1012 via a wired connection, wireless connection, or any combination thereof. In some embodiments, an input device or an output device from another computing device are used as input device(s) 1024 or output device(s) 1022 for computing device 1012. Device 1012 also includes communication connection(s) 1026 to facilitate communications with one or more other devices.

Figure 11:
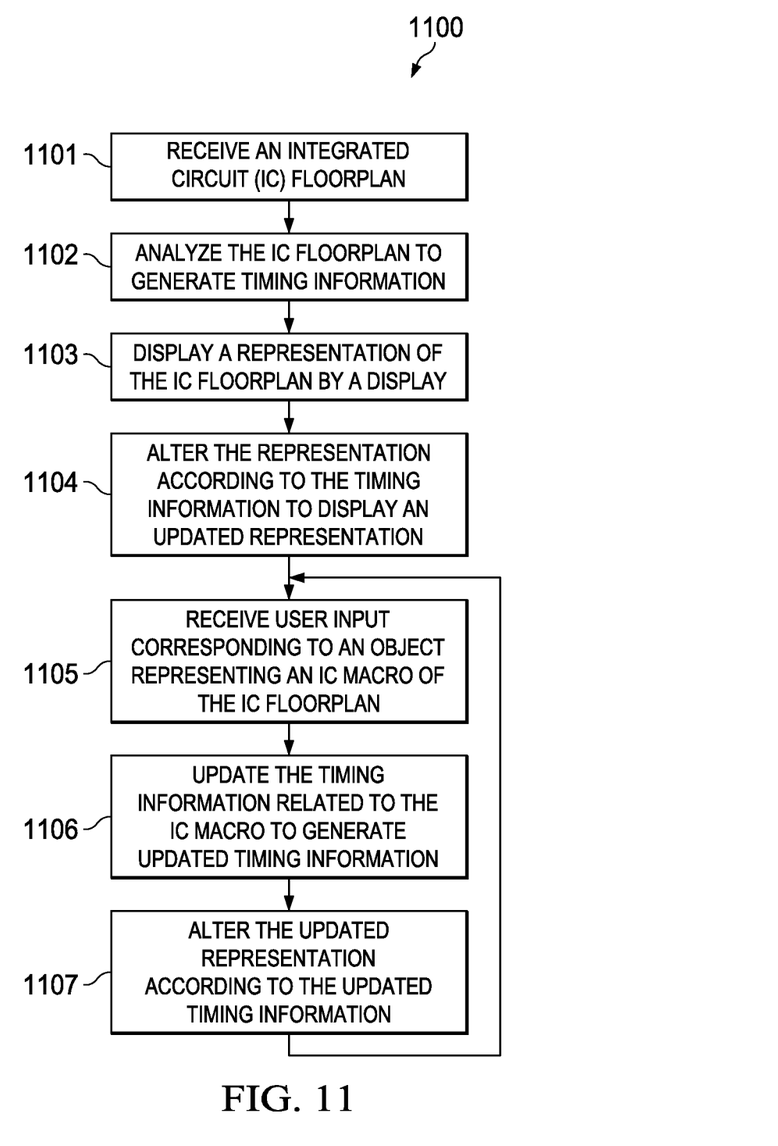
FIG. 11 is a flowchart of a process in accordance with various embodiments of the present disclosure.

FIG. 11 is a flowchart of a process 1100 in accordance with various embodiments of the present disclosure. In some embodiments, the process 1100 is performed using the system 1000 of FIG. 10. An IC floorplan is received 1101. In some embodiments, the IC floorplan is received 1101 through the communication connection 1026 and the network 1028. In some embodiments, the IC floorplan is received 1101 from the storage 1020 or the memory 1018. In some embodiments, the IC floorplan is received 1101 by the processing unit 1016.

The processing unit 1016 analyzes 1102 the IC floorplan to generate timing information associated with the IC floorplan. In some embodiments, the timing information includes positive slack (skew), negative slack (skew), types of timing violations, number of timing violations, fan-in, fan-out, and the like.

A representation (e.g., an original view) of the IC floorplan is displayed 1103 by a display. In some embodiments, the display is an output device of the output device(s) 1022 of the system 100. The representation is altered 1104 according to the timing information to display an updated representation (e.g., one of the views 200, 310, 40, 60, 70, 80, 90). In some embodiments, the altering 1104 is performed by the processing unit 1016. In some embodiments, the updated representation is displayed by the display. In some embodiments, the altering 1104 includes changing output color of pixels of the display associated with an IC macro graphic of the representation. In some embodiments, the altering 1104 includes changing output color of pixels to display a hatching pattern in a region of the display associated with the IC macro graphic. In some embodiments, the altering 1104 includes changing output color of pixels to display a bolding pattern in a region of the display associated with a border of the IC macro graphic. In some embodiments, the altering 1104 is associated with a range of timing values in which the timing information associated with an IC macro falls.

A loop including receiving 1105 user input, updating 1106 the timing information, and altering 1107 the updated representation is performed to provide visual cues in real time to a user as the user inputs control signals to the system 1000 (e.g., through at least one of the input device(s) 1024). In some embodiments, the user input received 1105 is associated with one object representing an IC macro of the IC floorplan. For example, a graphical object may be associated with the first IC macro of the IC floorplan. In some embodiments, the receiving 1105 includes capturing an input signal from at least one of the input devices 1024. For example, the input signal may include a downclick and dragging of a mouse of the system 1000. In some embodiments, the input signal includes a touch and drag performed on a touchpad of the system 1000. In some embodiments, the input signal includes a gesture performed using an optical input recognition system of the system 1000. In some embodiments, multiple IC macro graphics are selected by the user through the input device, and the user input includes downclick/dragging, touch, a gesture or the like to move the multiple IC macro graphics simultaneously (e.g., as a group). In some embodiments, the user input is directed to changing location of the at least one IC macro in the IC floorplan.

The timing information updated 1106 is related to the at least one IC macro. Updated timing information is generated by the updating 1106. In some embodiments, the updated timing information has the same form as the timing information (e.g., positive/negative skew, violation types/numbers, and the like). In some embodiments, the updating 1106 is performed by the processing unit 1016 of the system 1000. In some embodiments, the updating 1106 includes recalculating the timing information using the location associated with the user input received 1105.

In some embodiments, the updated representation is altered 1107 according to the updated timing information. In some embodiments, the altering 1107 includes changing output color of pixels of the display associated with an IC macro graphic of the representation. In some embodiments, the altering 1107 includes changing output color of pixels to display a hatching pattern in a region of the display associated with the IC macro graphic. In some embodiments, the altering 1107 includes changing output color of pixels to display a bolding pattern in a region of the display associated with a border of the IC macro graphic. In some embodiments, the altering 1107 is associated with a range of timing values in which the updated timing information associated with an IC macro falls.

Embodiments may achieve advantages. The design assistance UI 140 provides visual cues to the user to speed up floor planning decision-making. Highlighting graphics associated with IC macros indicates timing ranges of the IC macros. As the user repositions the IC macro graphics in the design assistance UI 140, real-time updated timing information associated with the IC macro graphics is displayed in the display (e.g., by changing color, hatching, etc. of the graphics).

In accordance with various embodiments of the present disclosure, a method includes (a) generating timing information of an integrated circuit (IC) floorplan by a processing unit; (b) displaying on a display device a representation of the IC floorplan according to the timing information; (c) receiving user input via an input device, the user input associated with an IC macro of the IC floorplan; (d) updating the timing information associated with the IC macro to generated updated timing information according to the user input; and (e) altering display of the representation according to the updated timing information.

In accordance with various embodiments of the present disclosure, a method includes (a) generating timing information of an integrated circuit (IC) floorplan by a processing unit; (b) displaying on a display device a representation of the IC floorplan in a first region of a display; (c) displaying a graphic associated with the timing information in a second region of the display; (c) receiving, via an input device, user input associated with an IC macro of the IC floorplan; (d) recalculating the timing information while receiving the user input to generate updated timing information; and (e) altering the display according to the updated timing information.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising". Moreover, the term "between" as used in this application is generally inclusive (e.g., "between A and B" includes inner edges of A and B).

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
receiving an integrated circuit (IC) floorplan at a processing unit;
analyzing the IC floorplan to generate timing information by the processing unit;
displaying in a first display area of a display device a representation of the IC floorplan, wherein the representation comprises a plurality of IC macro graphics, wherein at least one IC macro graphic has a highlight corresponding to the timing information;
displaying in a second display area of the display device adjacent to the first display area names, the timing information and hatching patterns for the plurality of IC macro graphics; and
iteratively performing a user-controlled interactive design process, wherein the user modifies the IC floorplan, wherein the highlight of the at least one IC macro graphic is updated in real-time according to a first updated timing information generated for the user modified IC floorplan, and wherein generation of the first updated timing information is performed in real-time as the user modifies the IC floorplan by interacting with the displayed representation of the IC floorplan.

2. The method of claim 1, wherein the timing information comprises timing violation information, skew information and fan-in information of the IC floorplan.

3. The method of claim 2, wherein skew information comprises negative slack information and positive slack information.

4. The method of claim 1, wherein the representation of the IC floorplan further comprises register graphics and connection paths of the IC floorplan.

5. The method of claim 1, wherein the user modifies the IC floorplan by changing location or parameters of the at least one IC macro graphic of the IC floorplan.

6. The method of claim 5, wherein the user changes location of the at least one IC macro graphic by selecting the at least one IC macro graphic, dragging and dropping the at least one IC macro graphic to a new location of the IC floorplan.

7. The method of claim 1, wherein the user modifies the IC floorplan by adding or removing circuit blocks or interconnects of the IC floorplan.

8. The method of claim 1, wherein the representation of the IC floorplan comprises at least one path associated with an IC macro graphic of the IC floorplan having a timing violation according to the timing information.

9. The method of claim 8, wherein the representation of the IC floorplan further comprises an indicator including a text string associated with a number of the timing information of the at least one path.

10. The method of claim 1, wherein the highlight comprises a color, a hatch pattern, a line width, or a text string.

11. The method of claim 1, wherein the performing the user-controlled interactive design process further comprises performing a useful skew function on the IC floorplan after the user modifies the IC floorplan, the performing the useful skew function comprising:
injecting clock tree delay in register-to-memory (R2M) paths connected to an IC macro graphic having positive slack in memory-to-register (M2R) paths connected to the IC macro graphic;
generating a second updated timing information of the IC floorplan after the injecting; and
modifying the highlight of one or more IC macro graphics of the floorplan according to the second updated timing information.

12. The method of claim 11, further comprising:
displaying in a third display area of the display device adjacent to the first display area the timing information, the first updated timing formation, and the second updated timing information for the plurality of IC macro graphics.

13. The method of claim 12, wherein the timing information, the first updated timing formation, and the second updated timing information for the plurality of IC macro graphics are displayed in a same figure.

14. The method of claim 1, wherein the highlight uses color, wherein a gradient color scale is used to define an association between the color and the timing information, and wherein the color of the at least one IC macro graphic changes along the gradient color scale in accordance with the first updated timing information as the user modifies the IC floorplan.

15. A method comprising:
    calculating timing information of an integrated circuit (IC) floorplan;
    displaying a representation of the IC floorplan according to the timing information through a user interface (UI), the UI having a plurality of display regions comprising:
        a first display region showing a floorplan view of the IC, wherein components of the floorplan view are displayed with highlighting based on the timing information; and
        one or more additional display regions adjacent to the first display region showing the timing information in formats other than the floorplan view in the first display region;
    receiving user input to modify the IC floorplan; and
    calculating an updated timing information on-the-fly as the user modifies the IC floorplan, and updating at least one of the plurality of display regions to reflect the updated timing information in real-time, wherein the timing information and the updated timing formation for a plurality of components of the floorplan view are displayed in a same graph in the one or more additional display regions.

16. The method of claim 15, wherein one of the one or more additional display regions displays macro names, the timing information and hatching patterns of one or more IC macros of the IC floorplan.

17. The method of claim 15, wherein one of the one or more additional display regions displays a graph comprising at least one data line, wherein the at least one data line is indexed along a horizontal axis by associated macros of the floorplan view, and wherein the at least one data line shows a timing metric value of the IC floorplan along a vertical axis.

18. The method of claim 15, wherein the plurality of display regions of the UI are updated at the same time according to the updated timing information.

19. The method of claim 15, wherein the floorplan view of the IC comprises a first group of register graphics coupled to a first component of the floorplan view, wherein the first group of register graphics has a first timing indicator comprising a first arrow and a first text string, the first arrow pointing from the first group of register graphics to the first component, and the first text string showing a first timing metric of the first group of register graphics.

20. A method comprising:
    receiving an integrated circuit (IC) floorplan at a processing unit;
    generating a baseline timing formation of the floorplan by a processing unit;
    displaying through a user interface (UI) a representation of the IC floorplan;
    modifying the IC floorplan in a plurality of design stages, and generating an updated timing information for each of the plurality of design stages;
    displaying the baseline timing formation and the updated timing information for the plurality of design stages in a same graph of the UI; and
    calculating a predictive timing information for each of the plurality of design stages on-the-fly as the IC floorplan is being modified by a user by interacting with the displayed representation of the IC floorplan, and updating the graph of the UI according to the calculated predictive timing information in real-time.

* * * * *